US009534507B2

(12) United States Patent
Sauerhoefer et al.

(10) Patent No.: US 9,534,507 B2
(45) Date of Patent: Jan. 3, 2017

(54) HARNESS SUPPORT AND MOUNT

(75) Inventors: Marc R. Sauerhoefer, Coventry, CT (US); Richard A. Ciamarra, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 1135 days.

(21) Appl. No.: 13/587,154

(22) Filed: Aug. 16, 2012

(65) Prior Publication Data

US 2014/0050571 A1 Feb. 20, 2014

(51) Int. Cl.
*F16L 3/00* (2006.01)
*F01D 25/24* (2006.01)
*F01D 25/28* (2006.01)
*H02G 3/32* (2006.01)

(52) U.S. Cl.
CPC .............. *F01D 25/243* (2013.01); *F01D 25/28* (2013.01); *H02G 3/32* (2013.01); *Y02T 50/672* (2013.01); *Y10T 29/49826* (2015.01)

(58) Field of Classification Search
CPC .......... F01D 25/243; F01D 25/28; F01D 9/06; H02G 3/32; H02G 3/02; H02G 3/386; H02G 3/30
USPC .......................................................... 292/70
See application file for complete search history.

(56) References Cited

U.S. PATENT DOCUMENTS

| 2,885,538 A | 5/1959 | Mahon et al. |
| 3,633,250 A | 1/1972 | Romney |
| 3,913,876 A | 10/1975 | McSherry |
| 4,512,159 A | 4/1985 | Memmen |
| 4,971,272 A | 11/1990 | Gudridge et al. |
| 5,201,799 A | 4/1993 | Johnson |
| 5,367,750 A * | 11/1994 | Ward ........................... 24/16 PB |
| 5,490,664 A | 2/1996 | Justus et al. |
| 5,694,678 A | 12/1997 | Karasik |
| 6,206,331 B1 * | 3/2001 | Keith et al. ................... 248/74.1 |
| 7,143,480 B2 * | 12/2006 | Igarashi ....................... 24/16 PB |
| 2002/0011548 A1 | 1/2002 | Parker |
| 2012/0137494 A1 | 6/2012 | Deterre et al. |

FOREIGN PATENT DOCUMENTS

| GB | 2429043 A | 2/2007 | |
| JP | 2004044751 A * | 2/2004 | ................ F16L 3/12 |
| JP | 2012092971 A | 5/2012 | |
| WO | 01/69117 A1 | 9/2001 | |

OTHER PUBLICATIONS

Takashi, Saddle for Fixing Pipes, Feb. 12, 2004, JP 2004044751 (translation).*

(Continued)

*Primary Examiner* — Craig Kim
*Assistant Examiner* — Jason Fountain
(74) *Attorney, Agent, or Firm* — Carlson, Gaskey & Olds, P.C.

(57) ABSTRACT

A disclosed harness assembly includes a base including a mounting surface and an opening that receives a mount end of a harness clip. A lockable clip is moveable between open and closed positions to secure one or more supply conduits or wire harnesses. The opening of the base includes a securement feature that corresponds with the mount end to hold the harness in a desired orientation relative to the base, to provide a fixed topographical routing.

18 Claims, 6 Drawing Sheets

(56) References Cited

OTHER PUBLICATIONS

International Search Report and Written Opinion for PCT Application No. PCT/US2013/051619 mailed on Oct. 15, 2013.
International Preliminary Report on Patentability for International Application No. PCT/US2013/051619 mailed Feb. 26, 2015.
European Search Report for EP Application No. 13829869.0 dated Aug. 24, 2015.

* cited by examiner

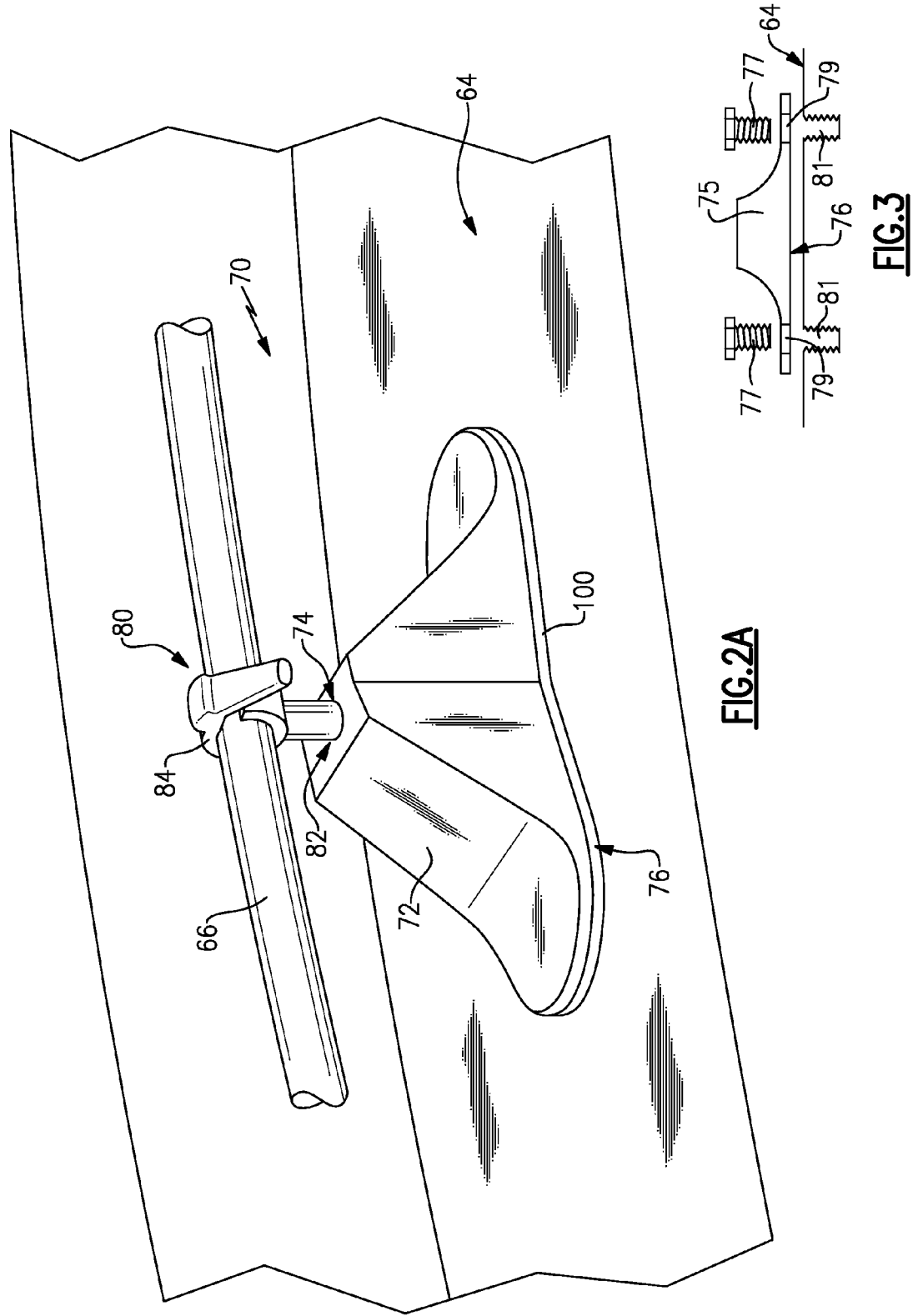

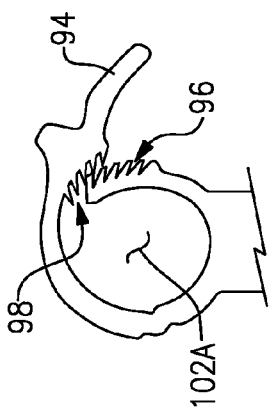
FIG.7A
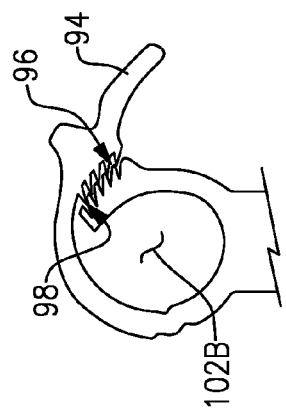
FIG.7B
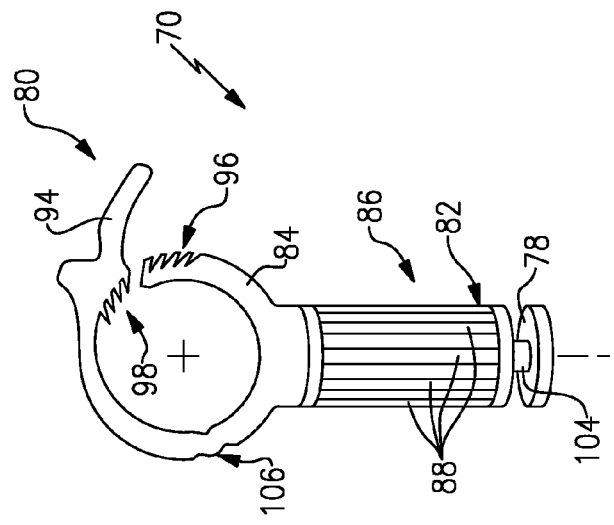
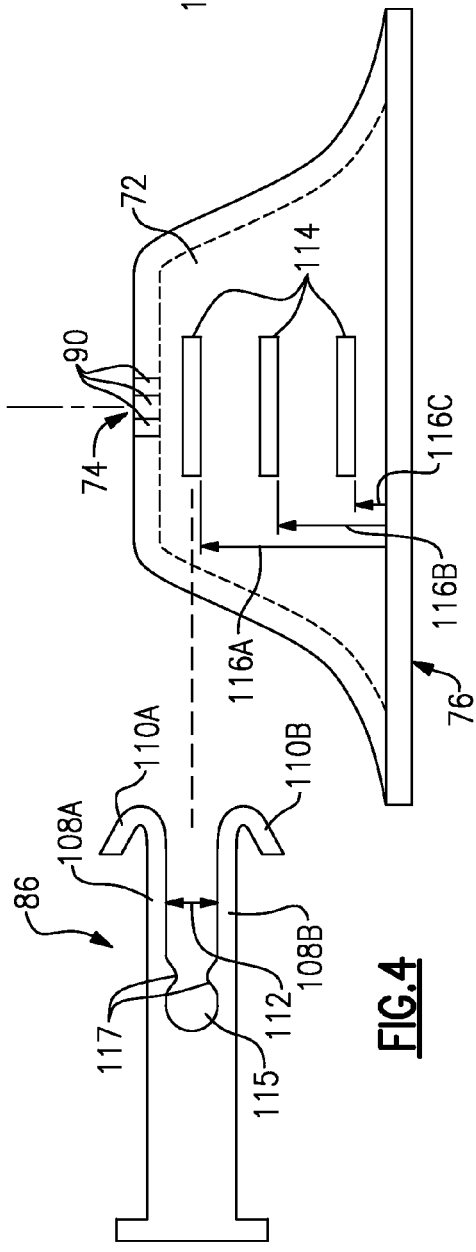
FIG.4
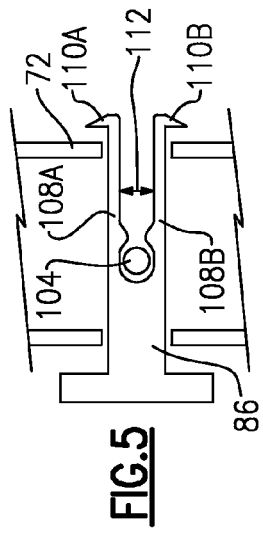
FIG.6
FIG.5

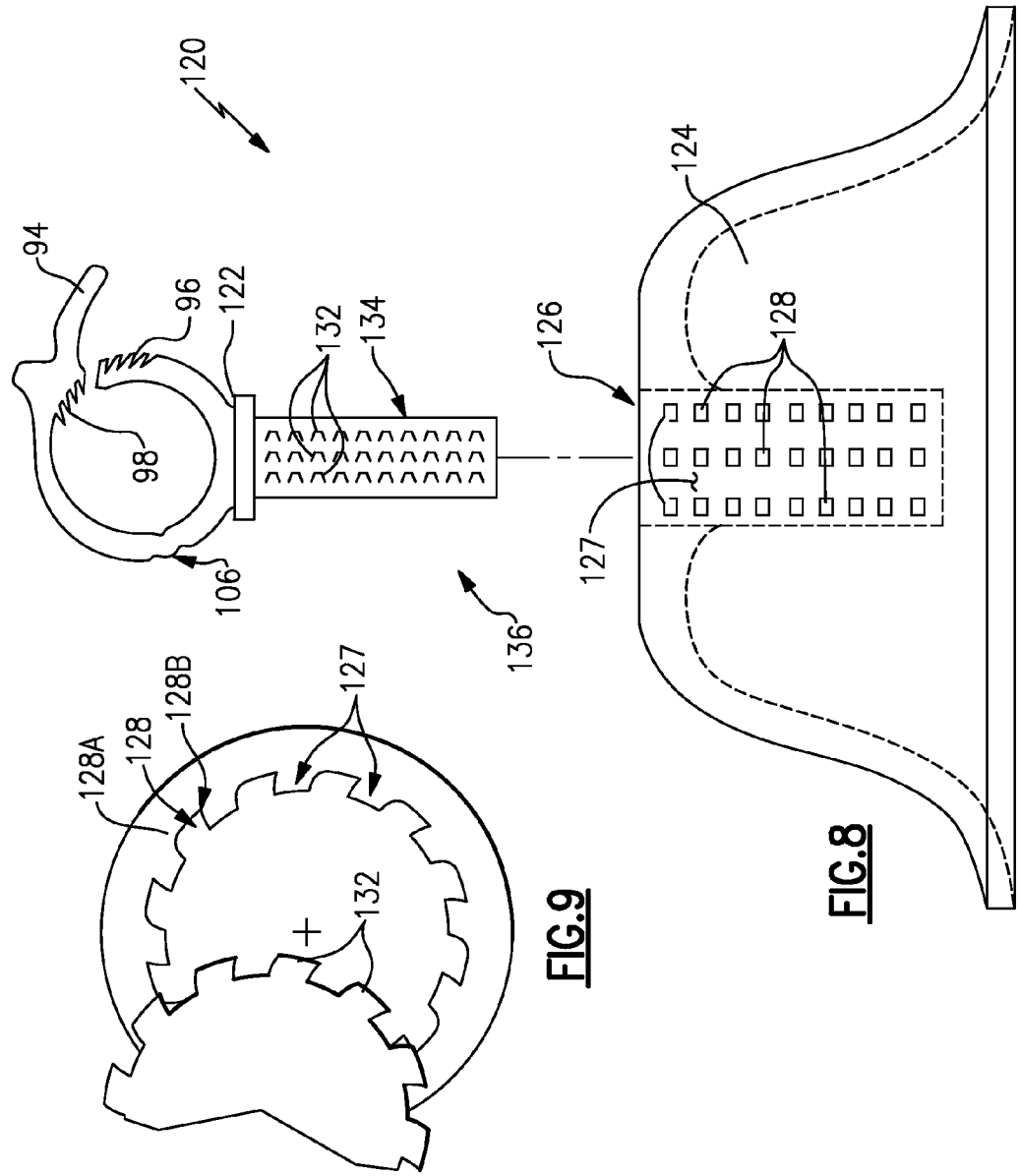
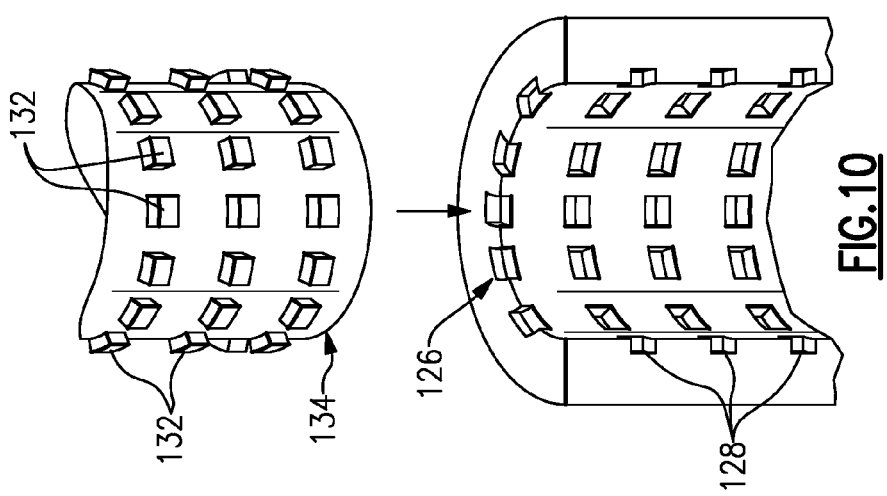

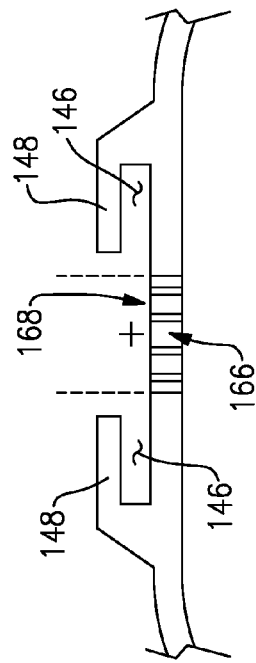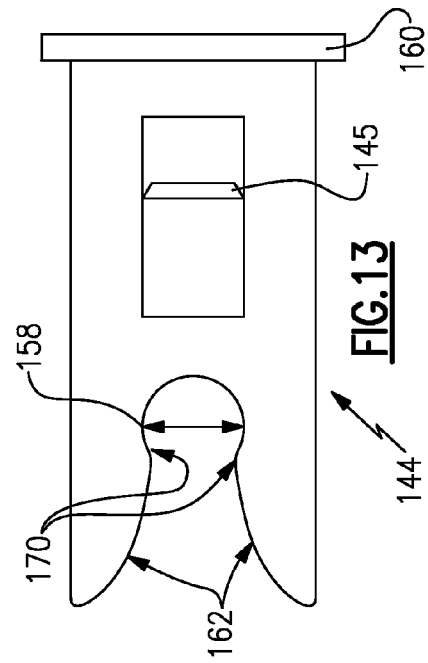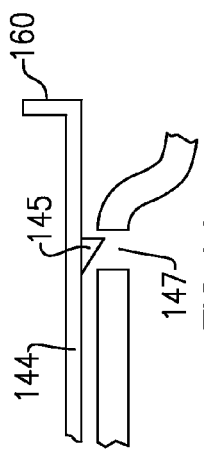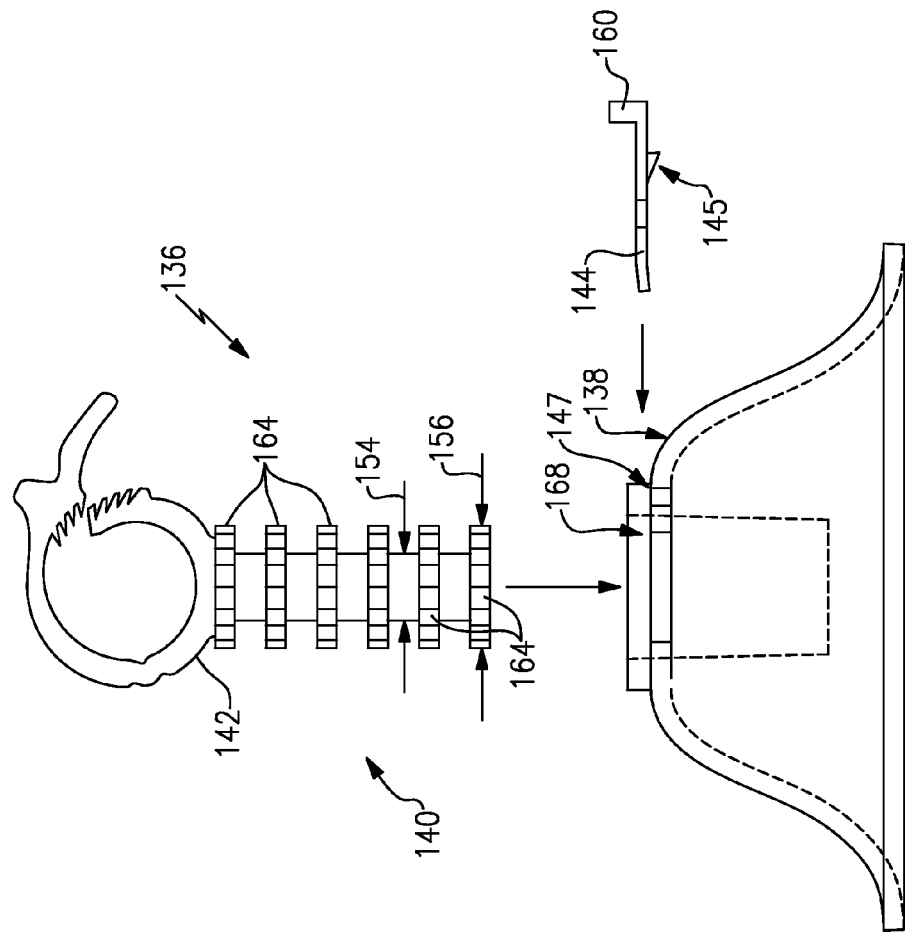

HARNESS SUPPORT AND MOUNT

BACKGROUND

A gas turbine engine typically includes a fan section, and an engine core including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section includes fan rotatable within a fan case. The fan case defines a bypass passage about the engine core that is much cooler than the environment within the engine core. Electrical components, wire harnesses and fluid conduits are routed through the cooler regions of the fan case that are suitable to lighter and less temperature capable materials. Wire harnesses and fluid conduits are rigidly mounted within the fan case at multiple locations. Conventional mounting structures utilize many machined, stamped, cut, bent sheet metal components along with studs or fasteners attached to the fan case. Many components can be costly and time consuming to assemble. Moreover, fan cases fabricated from composite material may require additional structures to support conventional mounting structures.

Accordingly, it is desirable to develop mounting structures compatible with any fan case materials that reduces costs and simplifies assembly.

SUMMARY

A harness assembly according to an exemplary embodiment of this disclosure, among other possible things includes a base including a mounting surface and an opening, a harness clamp including a mount end receivable within the opening and a lockable clip. The opening includes a first securement feature and the mount end includes a second securement feature engageable with the first securement feature for holding the harness in a fixed orientation relative to the base.

In a further embodiment of the foregoing harness assembly, includes first splines disposed about an inner surface of the opening and second splines on the mount end engageable with the first splines for defining a rotational orientation of the harness relative to the base.

In a further embodiment of any of the foregoing harness assemblies, the clip comprises a fixed portion and a movable portion and a lever disposed on the movable portion for unlocking the clip.

In a further embodiment of any of the foregoing harness assemblies, both the fixed portion and the movable portion include interlocking teeth for holding the fixed portion to the movable portion when in the locked position.

In a further embodiment of any of the foregoing harness assemblies, the clip defines an enclosed area when in the locked position. The interlocking teeth are engageable at an infinite number of positions to vary the enclosed area.

In a further embodiment of any of the foregoing harness assemblies, the opening includes a plurality of slots extending transverse to a centerline of the opening for a retainer extendable through corresponding slots for holding the harness to the base.

In a further embodiment of any of the foregoing harness assemblies, the retainer includes a spacing between fingers. The mount end of the harness includes a groove receivable within the spacing for securing the harness to the base.

In a further embodiment of any of the foregoing harness assemblies, the plurality of slots include corresponding slot pairs defining a height at which the harness extends from the base.

In a further embodiment of any of the foregoing harness assemblies, the opening includes recesses and the mount end includes barbs engageable to the recess of the opening for securing the harness to the base.

In a further embodiment of any of the foregoing harness assemblies, the recesses are arranged in circumferentially spaced apart columns on an inner surface of the opening and the barbs are arranged in circumferentially spaced apart columns on an outer surface of the mount end.

In a further embodiment of any of the foregoing harness assemblies, barbs in adjacent columns includes opposing angles such that rotation of the mount end within the opening moves the corresponding first barbs and second barbs from a released position to an engaged locking position.

In a further embodiment of any of the foregoing harness assemblies, the barbs are collapsible against a ramped recess through a cam action.

In a further embodiment of any of the foregoing harness assemblies, the recess contains a ramp feature an opposing interlock feature to prevent counter-rotation.

A fan section of a gas turbine engine according to an exemplary embodiment of this disclosure, among other possible things includes a case defining a bypass passage of a gas turbine engine, a base secured to the case, and the base includes an opening. At least one harness includes a mount end receivable within the opening and a lockable clip defines an enclosed space in a locked position. The opening includes a first securement feature and the mount end includes a second securement feature engageable with the first securement feature for holding the harness in a fixed orientation relative to the base, and a supply conduit secured within the lockable clip.

In a further embodiment of the foregoing fan section, includes first splines disposed about an inner surface of the opening and second splines on the mount end engageable with the first splines for defining a rotational orientation of the harness relative to the base.

In a further embodiment of any of the foregoing fan sections, the clip includes a fixed portion, a movable portion, interlocking teeth that are engageable at an infinite number of positions to vary the enclosed area and a lever disposed on the movable portion for unlocking the clip.

In a further embodiment of any of the foregoing fan sections, the opening includes a plurality of slots extending transverse to a centerline of the opening for a retainer extendable through corresponding slots for holding the harness to the base. The retainer includes a spacing between fingers and the mount end of the harness includes a groove receivable within the spacing for securing the harness to the base.

A method of securing a supply conduit to a surface according to an exemplary embodiment of this disclosure, among other possible things includes attaching a base to a surface, inserting a mount end of a harness into an opening defined within the base, inserting a portion of a supply conduit into a clip of the harness, and locking the clip around the supply conduit such that the supply conduit is held within an enclosed space defined by the clip.

In a further embodiment of the foregoing method, includes setting a rotational position between the harness and the base by mating splines on the mount end with splines within the opening of the base.

In a further embodiment of any of the foregoing methods, includes setting a height of the clip relative to the base by engaging first securement features of the opening with second securement features defined on the mount end of the harness.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2A is a schematic view of an example harness assembly attached to an outer surface of an example fan case.

FIG. 3 is another example harness assembly attached to a surface of a fan case assembly.

FIG. 4 is a schematic view of an example harness assembly.

FIG. 5 is a top schematic view of a portion of the example harness assembly.

FIG. 6 is a sectional view of a side of the example harness assembly clip.

FIG. 7A is a view of the example clamp closed in a first closed position.

FIG. 7B is a view of the example clamp shown in a second closed position.

FIG. 8 is another example harness assembly.

FIG. 9 is a top sectional view of an interface between a clamp trunion and the example base of the example harness assembly of FIG. 8.

FIG. 10 is a sectional view of an interface between the base and outer surface of the trunion of the example harness assembly of FIG. 8.

FIG. 11 is a schematic view of another example harness assembly.

FIG. 12 is a cross-section view of a portion of an example base.

FIG. 13 is a top view of another example retainer.

FIG. 14 is an enlarged view of a retaining tab on the retainer engaged to the base.

DETAILED DESCRIPTION

Figure 1:
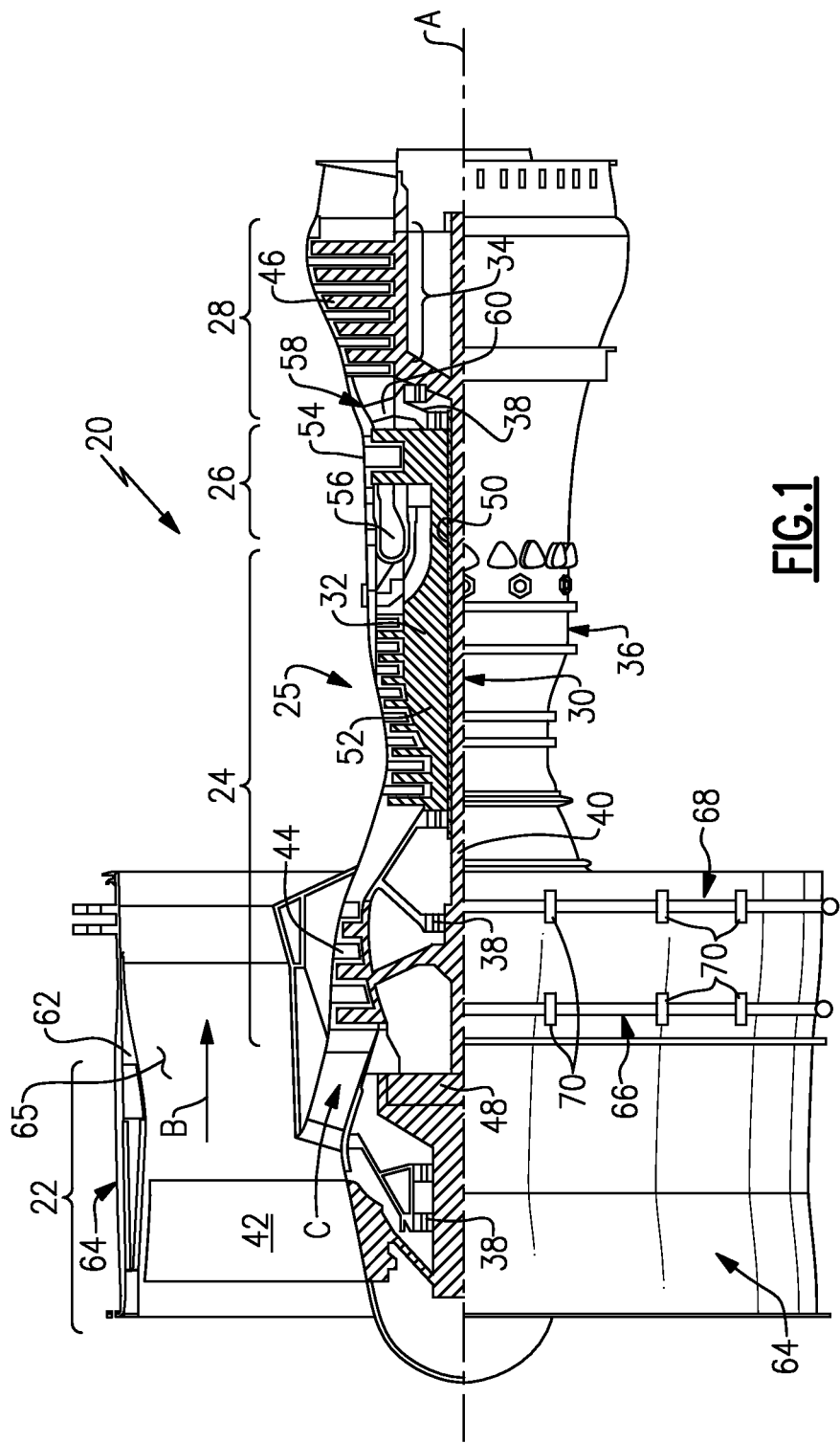
FIG. 1 is a schematic view of an example gas turbine engine.

FIG. 1 schematically illustrates an example gas turbine engine 20 that includes a fan section 22, and a core engine 25 including a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. Moreover, the disclosed example embodiments could be utilized in other commercial products and consumer goods.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram} \,°\text{R})/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example fan section 22 includes a fan case 62 that defines a bypass passage 65. Fan case 62 and bypass passage 65 is substantially cooler environment as compared to the core engine. Accordingly, supply conduits such as electric wiring and fluid conduits are routed upon an outer surface 64 of the fan case 62.

A harness assembly 70 secures a wire bundle 66 and also a fluid supply conduit 68 that may be connected to elements within the core engine 25. The harness assemblies 70 are attached to the outer surface 64 of the fan case 62 and secure the wiring bundle 66 and fluid conduit 68.

Referring to FIG. 2A, the example harness assembly 70 includes a base 72 attached to the outer surface 64 on a mounting surface 76. The mounting surface 76 is adhered to the outer surface 64 by way of an adhesive 100. The base 72 further defines an opening 74 that receives a harness clamp 80. In this example, the harness clamp 80 includes a clamp 84 and a mount end 82 received within the opening 74.

Figure 2B:
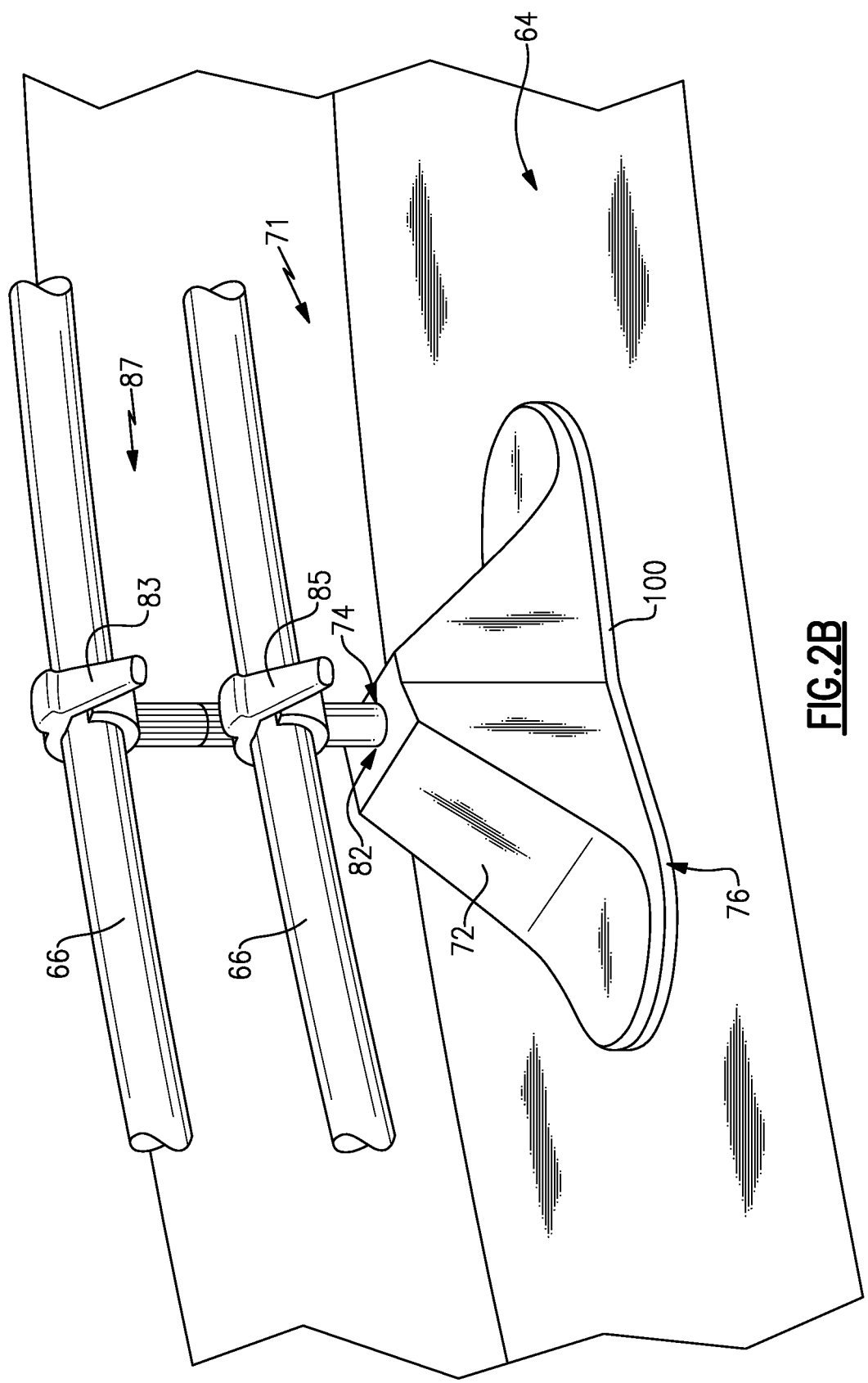
FIG. 2B is another schematic view of an example harness assembly attached to the outer surface of an example fan case.

Referring to FIG. 2B, another example harness assembly 71 includes a base 72 attached to the outer surface 64 on a mounting surface 76. A harness clamp 87 includes a first clamp 83 and a second clamp 85 that are attached through a common mount end 82 to the base 72. As appreciated, any number of clamps 83, 85 could be supported on the common base 72.

Referring to FIG. 3, another example base 75 is secured to the outer surface 64 by way of threaded fastener 77. In this example the base 75 includes openings 79 through which fasteners 77 extend. In this example, the surface 64 includes threaded openings 81 that receive the threaded fasteners 77. As appreciated, although the example illustrated in FIG. 3 includes threaded openings 81, other methods of securing the base 75 to the surface 64 by way of mechanical fasteners are also within the contemplation of this disclosure.

Referring to FIG. 4, the example base 72 includes a plurality of slots 114 and splines 90 defined within opening 74. The example harness clamp 80 further includes the mount end 82 on an end opposite the clamp 84. The mount end 82 includes a plurality of splines 88 that correspond with splines 90 defined within an inner surface of the opening 74. The splines 88 and 90 interlock to maintain a desired rotational orientation of the clamp 84 relative to the base 72.

The example clamp 84 defines a generally enclosable structure closable by engaging interlocking first and second sets of teeth 96, 98. The clamp 84 includes a hinged portion 106 that provides for movement from a closed position (FIG. 7A and FIG. 7B) to an opened position providing for removal of the wire bundle 66 and/or fluid conduit 68. The clamp 84 is closable by engaging the first teeth 96 with the second teeth 98 by pressing on the lever 94.

Referring to FIGS. 7A and 7B with continued reference to FIG. 4, the clamp 84 is closable by engaging the first teeth 96 and the second teeth 96 to define the enclosed area 102A. The enclosed area 102A can be varied to correspond with the size and shape of the wire bundle, fluid conduit or other supply conduit being secured by the harness assembly 70. In this example the enclosed area 102A is provided by closing the clamp 84 to a first closed position (FIG. 7A) to define the first enclosed area 102A. Further pressing of the lever 94 engages further sets of the first teeth 96 and the second teeth 98 such that the clamp 84 is moved to a second closed position (FIG. 7B) that defines a second enclosed area 102B different and in this example smaller than the first enclosed area 102A.

As appreciated, the enclosed area 102A is adjustable by moving engagement of the teeth 96 and 98. Accordingly, the closed area defined by the clamp 84 is infinitely adjustable to compensate for size variations of wire harnesses, fluid conduits and other supply conduits that are secured within the example gas turbine engine assembly.

Referring to FIG. 4, with reference to FIGS. 5 and 6, the example harness clamp 80 is secured within the base 72 with a retainer 86. The retainer 86 includes first and second fingers 108A and 108B. Tabs 110A and 110B are provided on each of the first and second fingers 108A and 108B. The fingers 108A and 108B extend through slots 114 that are defined in the base 72. Corresponding slots 114 are provided on both sides of the opening 74 within the base 72. The fingers 108A and 108B are set apart by a spacing 112. The spacing 112 fits within grooves 78 defined along the on the mount end 82 of the harness clamp 80. The vertical position of the harness clamp 80 relative to the base 72 is defined by inserting the retainer 86 through one of the plurality of slots 114. The slots 114 are each spaced at different heights 116A, 116B and 116C and grooves 78. The various heights allow for the incremental vertical adjustment and mounting of the harness clamp 80 onto the base 72.

The harness clamp 80 is inserted through the opening 74 such that the splines 88 interlock with relieve splines 90 to set a desired rotational position of the harness clamp 80 relative to the base 72. The vertical height is then fixed by inserting the retainer 86 through one of the plurality of slots 114 and aligning the retaining channels 112 with one of the corresponding grooves 78. The retainer is guided through one of the grooves 78 and is aligned with the corresponding slot 114 on the opposite side of the base 72. The retainer 86 is further slid along the channel 112 until the lock tabs 110A, 110B emerge from the opposing slot 114 and snap open wider than the slot 114. The retainer 86 is further pushed along the channel 112 until the diameter of the slot 78 overcomes the narrower features of lock bumps 117 and comes to rest in the center opening 115.

Once the harness clamp 80 is secured within the base 72, the wiring harness or fluid conduit is inserted within the area 102B and the lever 94 press down such that the first and second plurality of teeth 96, 98 engage around the conduit as is shown more clearly in FIG. 2. Because the plurality of teeth 98 and 96 can intermesh anywhere along their respective lengths, the enclosed area 102A that is defined by the clamp 84 can be varied to compensate for conduits of different diameters and sizes.

Referring to FIGS. 8, 9 and 10, another example harness clamp assembly 120 includes a clamp 136 that is insertable into base 124. The base 124 includes the cavity 126 having a plurality of recesses 128. The recesses 128 are arranged in vertical columns, repeated circumferentially about the center of the cavity 126. These recesses correspond to barbs 132 in the clamp 136. The interaction between recesses 128 disposed in columns and the barbs 132 establish the relative height of the harness centerline from the base 124.

A ramped trailing-edge 128A of recess 128 provides a cam action against the leading-edge of barb 132 upon rotation of the clamp 136. This action effectively compresses and closes the barb 132 to an effective inside diameter 127 of the cavity 126. In the compressed closed state, the clamp 136 can slide vertically to select the height of clamp 136 to the base 124 and ultimately the relative location of harness centerline. Once the desired height is set at the nearest recess height, rotation of clamp 136 interlocks the barbs 132 within the recess 128. Counter rotation is prevented by the opposition provided by the non-ramped surface 128b of the recess 128 against end faces of the barb 132. No further rotation can occur once the harness is clamped.

Referring to FIGS. 11, 12, 13, and 14 another disclosed harness assembly 136 includes a clamp 140 secured within a base 138 by a retainer 144. The clamp 140 includes the clip 142 and a plurality of splines 164 that interlock with splines 166 defined within an opening 168 of the base 138. The interlocking splines 164, 166 set a rotational orientation of the clamp 140 relative to the base 138.

A retainer 144 fits within channels 146 defined by flanges 148 disposed proximate the opening 168. The clamp 140 includes a first diameter 154 and a second diameter 156 that is larger than the first diameter 154. The first diameter 154 and the second diameter alternate along the clamp 140 to provide adjustment of a vertical position relative to the base 138. The retainer 144 includes lead in 162 and diameter 158 that corresponds with the first diameter 154 to lock the clamp 140 in place. The diameter 158 is a slight interference fit to hold the clamp 140 in place. The diameter 158 also includes nubs 170 that provide a snap fit into the first diameter 154 of the clamp 140 to further hold the retainer 144 in place. The retainer includes a handle 160 for pushing the retainer through the channels 146 into engagement with the clamp 140. The handle 160 also provides for removal of the retainer 144 to provide for removal and repositioning of the clamp 140.

The channels 146 provide primary retention for the retainer 144. The retainer further includes a tab 145 that engages a slot 147 on outer surface of the base 138 once positioned within the channels 146. The tab 145 prevents movement back out of the channels 146 and provides a secondary retaining function that prevents separation of the retainer 144 from the base 138.

Accordingly, the example harness assemblies provide for the securement of multiple harness assemblies having different configurations in sizes. Moreover, the example harness assembly includes a base that is attachable to structures without the use of mechanical fasteners to provide a harness assembly usable with composite fan cases 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A harness assembly comprising:
a base including a mounting surface and an opening;
a harness clamp including a mount end receivable within the opening and a lockable clip, the opening including a first securement feature and the mount end including a second securement feature engageable with the first securement feature for holding the harness in a fixed orientation relative to the base, wherein the harness clamp includes first splines extending longitudinally about an inner surface of the opening and second splines extending longitudinally along the mount end, the second splines engagable with the first splines for defining a rotational orientation of the harness relative to the base.

2. The harness assembly as recited in claim 1, wherein the clip comprises a fixed portion and a movable portion and a lever disposed on the movable portion for unlocking the clip.

3. The harness assembly as recited in claim 2, wherein both the fixed portion and the movable portion include interlocking teeth for holding the fixed portion to the movable portion when in the locked position.

4. The harness assembly as recited in claim 3, wherein the clip defines an enclosed area when in the locked position, wherein the interlocking teeth are engageable to vary the enclosed area.

5. The harness assembly as recited in claim 1, wherein the first splines within the opening extend transverse to the mounting surface.

6. The harness assembly as recited in claim 1, wherein the second splines extend longitudinally from the mount end toward the lockable clip.

7. A harness assembly comprising:
a base including a mounting surface and an opening;
a harness clamp including a mount end receivable within the opening and a lockable clip, the opening including a first securement feature and the mount end including a second securement feature engageable with the first securement feature for holding the harness in a fixed orientation relative to the base, wherein the opening includes a plurality of slots extending transverse to a centerline of the opening for a retainer extendable through corresponding slots for holding the harness to the base.

8. The harness assembly as recited in claim 7, wherein the retainer includes a spacing between fingers and the mount end of the harness includes a groove receivable within the spacing for securing the harness to the base.

9. The harness assembly as recited in claim 7, wherein the plurality of slots include corresponding slot pairs defining a height at which the harness extends from the base.

10. A harness assembly comprising:
a base including a mounting surface and an opening;
a harness clamp including a mount end receivable within the opening and a lockable clip, the opening including a first securement feature and the mount end including a second securement feature engageable with the first securement feature for holding the harness in a fixed orientation relative to the base, wherein the opening includes recesses and the mount end includes barbs engageable to the recess of the opening for securing the harness to the base and the recess contains a ramp feature and an opposing interlock feature to prevent counter-rotation.

11. The harness assembly as recited in claim 10, wherein the recesses are arranged in circumferentially spaced apart columns on an inner surface of the opening and the barbs are arranged in circumferentially spaced apart columns on an outer surface of the mount end.

12. The harness assembly as recited in claim 11, wherein barbs in adjacent columns including opposing angles such that rotation of the mount end within the opening moves the corresponding first barbs and second barbs from a released position to an engaged locking position.

13. The harness assembly as recited in claim 10, wherein the barbs are collapsible against a ramped recess through a cam action.

14. A fan section of a gas turbine engine including:
a case defining a bypass passage of the gas turbine engine;
a base secured to the case, the base including an opening;
at least one harness including a mount end receivable within the opening and a lockable clip defining an enclosed space in a locked position, the opening including a first securement feature and the mount end including a second securement feature engageable with the first securement feature for holding the harness in a fixed orientation relative to the base, wherein the opening includes a plurality of slots extending transverse to a centerline of the opening for a retainer extendable through corresponding slots for holding the harness to the base, the retainer including a spacing between fingers and the mount end of the harness includes a groove receivable within the spacing for securing the harness to the base; and
a supply conduit secured within the lockable clip.

15. The fan section as recited in claim 14, including first splines disposed about an inner surface of the opening and second splines on the mount end engageable with the first splines for defining a rotational orientation of the harness relative to the base.

16. The fan section as recited in claim 14, wherein the clip comprises a fixed portion, a movable portion, interlocking teeth that are engageable to vary an enclosed area and a lever disposed on the movable portion for unlocking the clip.

17. A method of securing a supply conduit to a surface comprising;
attaching a base to the surface;
inserting a mount end of a harness into an opening defined within the base;
inserting a portion of a supply conduit into a clip of the harness including setting a rotational position between the harness and the base by mating splines on the mount end with splines within the opening of the base; and
locking the clip around the supply conduit such that the supply conduit is held within an enclosed space defined by the clip.

18. The method as recited in claim 17, including setting a height of the clip relative to the base by engaging first securement features of the opening with second securement features defined on the mount end of the harness.

* * * * *